United States Patent [19]

Ou

[11] Patent Number: 4,961,637
[45] Date of Patent: Oct. 9, 1990

[54] REAR VIEW LENS APPARATUS FOR AUTOMOTIVE VEHICLE

[76] Inventor: Jan-Chou Ou, 5F, 2, Alley 7, Lane 100, Tun Hwa South Road, Taipei, Taiwan

[21] Appl. No.: 258,170

[22] Filed: Oct. 14, 1988

[51] Int. Cl.⁵ .................. G02B 7/02; G02B 23/08
[52] U.S. Cl. .................. 350/573; 350/250; 350/256; 350/618
[58] Field of Search ........... 350/561, 572, 573, 574, 350/575, 452, 240, 250, 256, 540, 319, 618; 358/108

[56] References Cited

U.S. PATENT DOCUMENTS

| | | | |
|---|---|---|---|
| 1,977,019 | 10/1934 | Smith | 350/618 |
| 2,398,354 | 4/1946 | Brinkley | 350/618 |
| 2,512,792 | 6/1950 | Delaney | 350/540 |
| 3,280,700 | 10/1966 | Donnelly et al. | 350/540 |
| 3,809,461 | 5/1974 | Baumgardner et al. | 350/452 |
| 3,809,462 | 5/1974 | Baumgardner et al. | 350/452 |
| 4,274,714 | 6/1981 | Okamura | 350/452 |
| 4,277,804 | 7/1981 | Robison | 358/108 |
| 4,688,905 | 8/1987 | Okamura | 350/540 |

FOREIGN PATENT DOCUMENTS

| | | | |
|---|---|---|---|
| 1227476 | 8/1960 | France | 350/573 |
| 2425959 | 1/1980 | France | 350/618 |

Primary Examiner—Rodney B. Bovernick
Assistant Examiner—Martin Lerner
Attorney, Agent, or Firm—Dvorak and Traub

[57] ABSTRACT

An optical means for an automotive vehicle which expands a driver's visual coverage to include areas which are usually not visible by means of conventional rear view mirrors, comprising an elongated optical conduit which contains a multiple number of convex lenses inside, said convex lenses positioned so that the outside view behind the vehicle can be captured by said optical conduit and thereafter formed into a magnified real and upright image in the optical conduit. A tiltable viewing mirror is provided in front of the optical conduit to enable a driver of the vehicle to view the image in the optical conduit. The optical conduit may be placed underneath a car top, or in a rear trunk compartment, thereby capturing the rear view behind the vehicle. The optical conduit may be folded into a compact size to reduce headroom interference in the vehicle.

1 Claim, 11 Drawing Sheets

REAR VIEW LENS APPARATUS FOR AUTOMOTIVE VEHICLE

BACKGROUND OF THE INVENTION

This invention relates to an optical means to enable a viewer to expand the viewing scope around a visual obstacle, and more particularly to an optical system for a vehicle to enable a driver within the vehicle to see those areas adjacent a rear bumper of the vehicle which are normally not visible by means of conventional rear view mirrors.

A conventional internal rear view vehicle mirror usually has a visual restriction, i.e., it cannot cover the area close behind the rear bumper. This "blind" spot to the vision of a driver in the vehicle usually extends at least five meters beyond the rear bumper. Side mounted external mirrors cannot provide a rear view behind the rear bumper. The existence of this "blind" spot makes driving in reverse awkward or even hazardous.

Many different schemes have been proposed to resolve this problem. However, very few have achieved practical and commercial significance.

SUMMARY OF THE INVENTION

It is an object of the present invention to provide an optical means to enable a driver of a vehicle to see areas close behind a rear bumper which are normally not visible, so that the driver may drive in reverse more effectively, with less guess work and more safely.

It is another object of the present invention to provide an optical means, in a compact and largely self-contained unit, which can be carried in a vehicle without significant vehicle body modification.

It is a further object of the present invention to provide an optical means with a versatile structure which can be easily adapted to different types of vehicles, such as sedans, station wagons, vans, buses, panel trucks, etc.

It is yet another object of the present invention to provide an optical means with a foldable structure which can be extended during use, and can be folded to a compact size for storage to reduce head room interference.

It is still another object of the present invention to provide an optical means having an elongated optical conduit which moves outside images to a convenient viewing area, thereby reducing obstructions between those images and the driver.

The present invention embodying these objects comprises several forms and embodiments, all of which utilize an elongated optical conduit in which a multiple number of convex lenses have been spaced from each other so that the rear view behind the vehicle will be captured, forming a final real and upright image in the optical conduit. A viewing mirror or reflecting means is provided in front of the optical conduit to enable a driver in the vehicle to see the image in the optical conduit.

These and other objects, advantages and features of the present invention will become apparent from the following description of embodiments with reference to the accompanying drawings.

DETAILED DESCRIPTION OF THE PREFERRED EMBODIMENTS

Referring to the drawings, similar or corresponding components are designated by like reference numerals or characters throughout the various FIGS.

Figure 1:
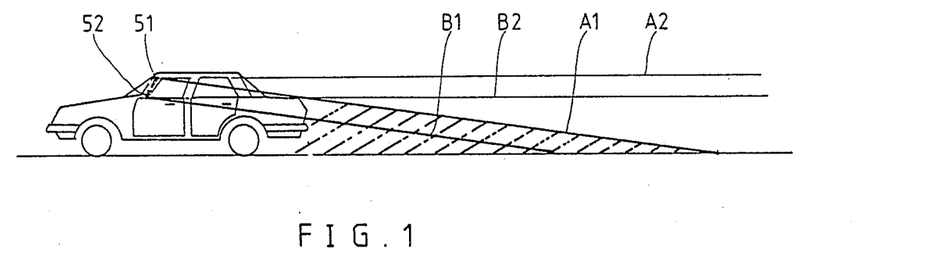
FIG. 1 is a schematic side view of a conventional vehicle showing visual coverage afforded by internal and external mirrors.
Figure 2:
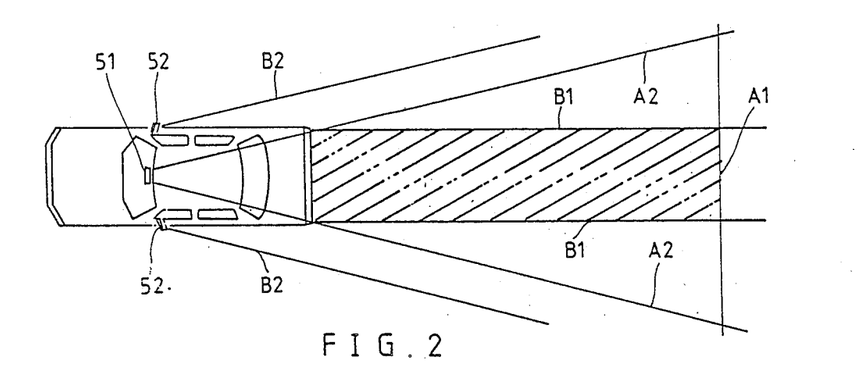
FIG. 2 is a schematic top view of a conventional vehicle showing visual coverage afforded by internal and external mirrors.

FIGS. 1 and 2 illustrate the rear visual coverage area of a typical automobile, including a "blind" spot shown by a shaded portion. This "blind" spot cannot be seen by a driver through conventional internal or external rear view mirrors. 51, 52, A1, and A2 show the visual boundary of a conventional internal mirror. 51, B1, and B2 show the visual boundary of the conventional external rear mirrors 52. The resultant "blind" spot behind the car is usually five meters or more, measuring from rear bumper 83 to boundary A1.

Figure 3:
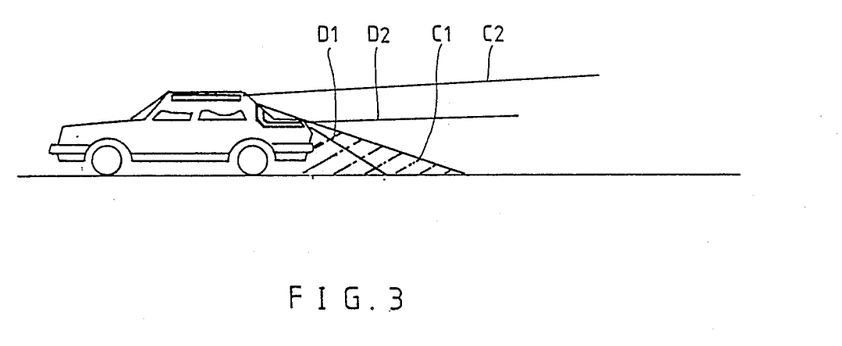
FIG. 3 is a schematic side view of the embodiments of the present invention, showing the range of visual coverage on a conventional vehicle.

FIG. 3 illustrates the rear visual coverage area after adopting the present invention. Depending on the various focal lengths of the lenses being used, and also the different types of embodiments, the "blind" spot can be reduced to one meter or less.

C1 and C2 depict the rear visual boundary of an embodiment which is affixed underneath the car roof;

D1 and D2 depict the rear visual boundary of an embodiment which is placed in the rear trunk compartment.

Figure 4:
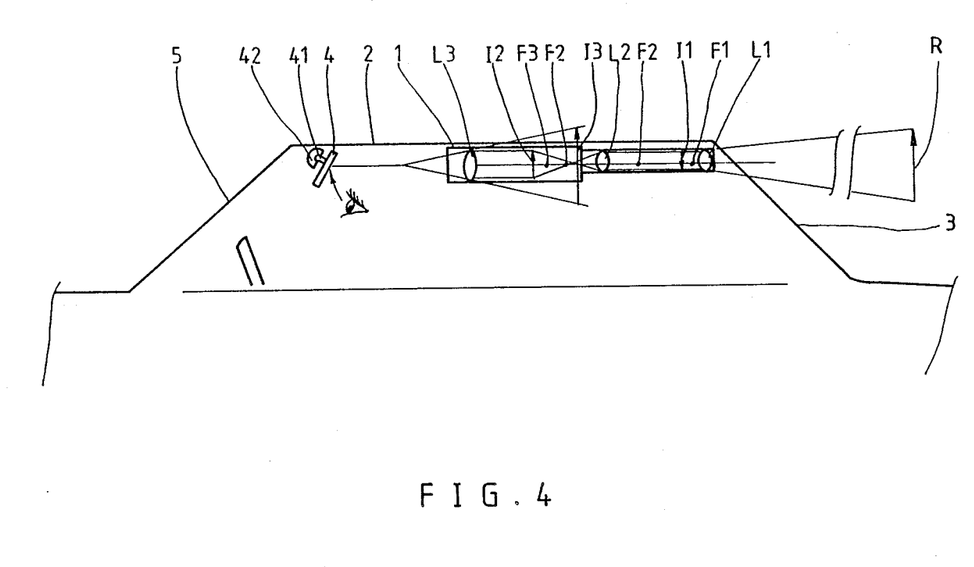
FIG. 4 is a sectional side view of an embodiment of the present invention adapted for use on a sedan type automobile.

FIG. 4 illustrates an embodiment of the present invention being adopted to a sedan type automobile. An optical conduit 1 is longitudinally affixed underneath the car roof 2, with its rear opening 1R facing the upper side of the rear window 3, and its front opening 1F facing the windshield 5. Object lens L1 is a convex lens, and is secured at the rear opening 1R. Transfer lens L2, being a convex lens with its focal length greater than its diameter, is located in front of object lens L1 and at a distance greater than the sum of focal lengths of L1 and L2. Viewing lens L3, preferably a convex lens and with a focal length greater than its diameter, is located in front of transfer lens L2 at a distance greater than the sum of the focal length of L2 and L3.

Rear view R first forms a real and inverted image I1 after passing through lens L1, then becomes a real and upright image I2 after passing through lens L2. Viewing lens L3 is positioned such that its focal point F3 will pass beyond image I2. A final, magnified, real and upright image I3 will be formed in the optical conduit 1. A viewing mirror 4 is placed in front of front opening 1F, to allow a driver in the vehicle to see the image I3, which represents rear view R.

Mirror 4 is attached underneath a vehicle top, or attached to an extension of the optical conduit 1 by means of a bracket 42 and a ball joint 41. This mounting arrangement allows the driver to tilt the viewing mirror 4 to suit his view. F1, F2, and F3 are focal points of lens L1, L2, and L3, respectively.

Figure 5:
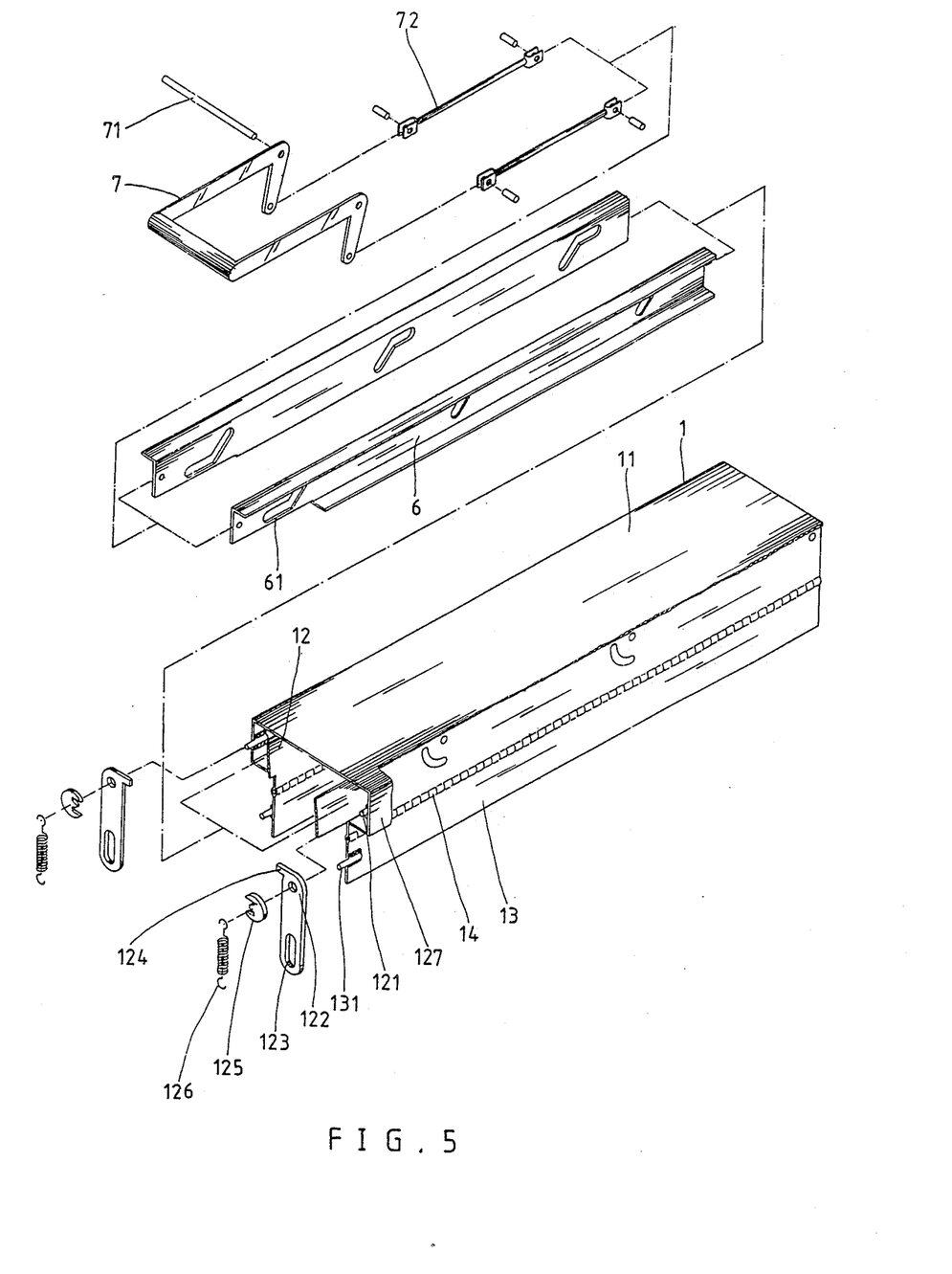
FIG. 5 is a fragmentary break-up view of another embodiment of the present invention relating to the structure of a foldable optical conduit.
Figure 6:
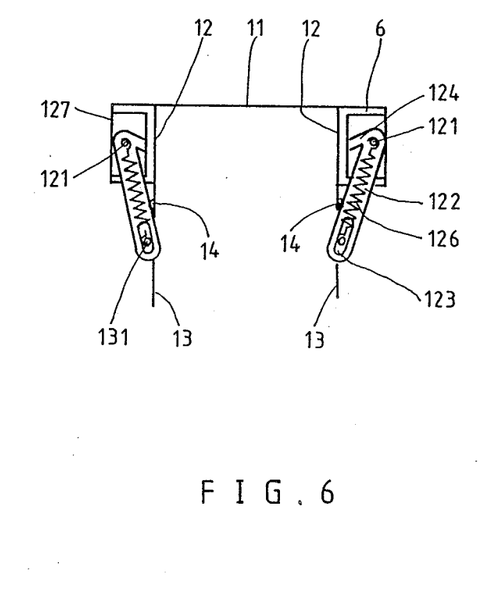
FIG. 6 is a fragmentary front view of another embodiment of the present invention shown in FIG. 5.
Figure 7:
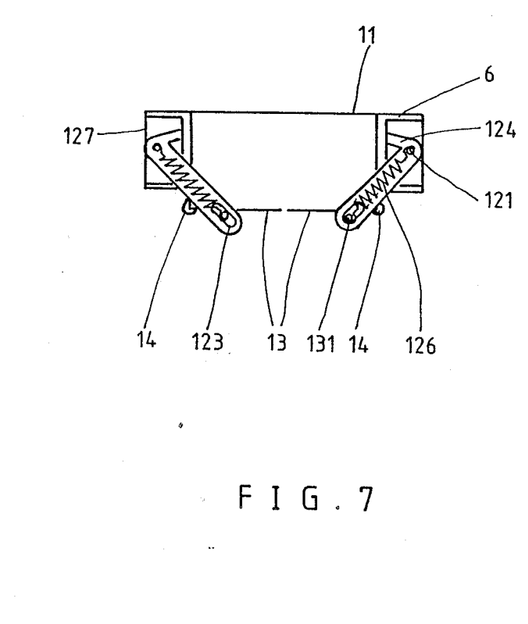
FIG. 7 is a fragmentary front view of another embodiment of the present invention shown in FIG. 5.
Figure 12:
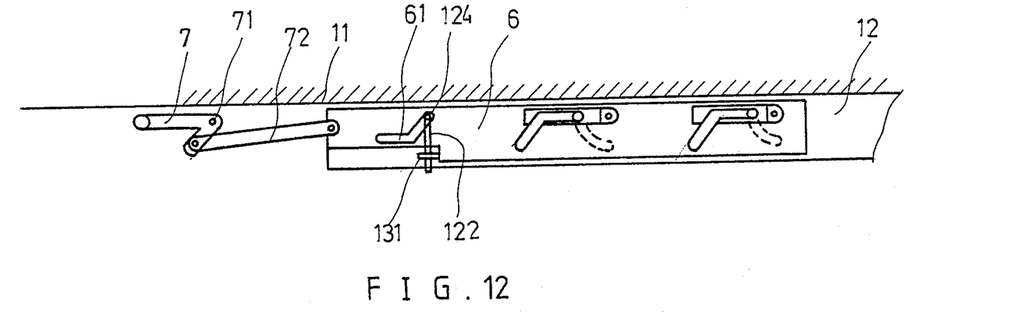
FIG. 12 is a fragmentary cutaway side view of another embodiment of the present invention showing handle and actuating frame in a folded state shown in FIG. 5.
Figure 13:
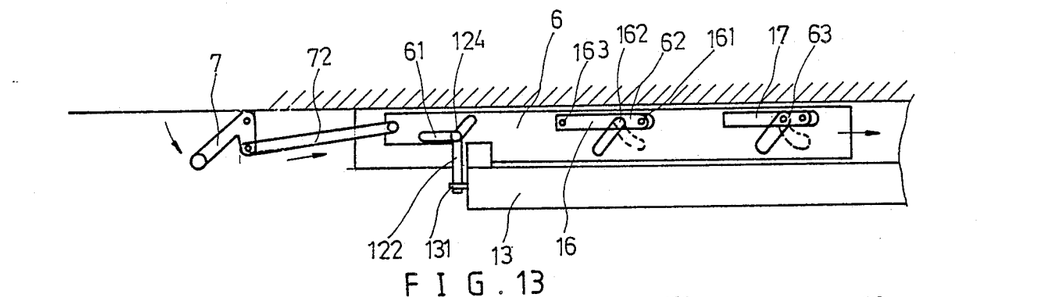
FIG. 13 is a fragmentary cutaway side view of another embodiment of the present invention showing the handle in an intermediate position shown in FIGS. 5 and 8.

FIGS. 5, 6, and 7 illustrate an embodiment of the present invention which is capable of being folded into a compact size so as to create more headroom in the vehicle. This embodiment comprises a top wall 11 which is affixed underneath the car roof, two upper side walls 12 fixed on the top wall 11 two lower side walls 13, each connecting with an upper side wall 12 via a hinge 14, respectively, a fixed bordering frame 127 provided outside of each upper side wall 12, a pivot 121 fixed on a front edge of each bordering frame 127, a rocker arm 122 held on the pivot 121, one end of the rocker arm 122 having a slot 123 which engages with a stud 131 attached to a front edge of a lower side wall 13, another end of the rocker arm acting as an actuating lever 124 and being inserted into a curved slot 61 on a slidable actuating frame 6 which is sandwiched between the side wall 12 and the bordering frame 127, a retaining washer 125 which keeps rocker arm 122 on the pivot 121, a tension spring 126 which has one end engaging a pivot 121, and another end engaging a stud 131, a linkage 72 connecting the actuating frame 6 with a handle 7 which is hung transversely on an extension of the upper side wall 12 via a spindle 71. Referring to FIGS. 12 and 13, when handle 7 is moved halfway down from a horizontal position, linkage 72 pushes actuating frame 6 in a rearward direction and slot 61 moves actuating the lever 124 downward. Referring to FIGS. 6 and 7, slot 123 of the rocker arm 122 pushes the stud 131 downward, thus moving the lower side wall 13 from a horizontal folded position to a vertical extended position. Applying the same principle in reverse, moving the handle 7 back to a horizontal position will move the lower side wall 13 back into a folded position.

Tension spring 126 provides additional force to keep the lower side wall 13 in a horizontal or vertical position. FIGS. 8, 9, 10, and 11 illustrate means to fold or extend the lenses of the foldable optical conduit. Lens sets L3, L2, and L1 are held, respectively, in rectangular lens frames 16, 17, and 18, which are transversely hung on the two upper side walls 12. Taking lens frame 16 as an example, 161 is a supporting spindle, and 128 is a supporting hole on the wall 12. There is a curved slot 129 around hole 128 for the lens frame 16, and a curved slot 130 for the lens frame 17.

Figure 8:
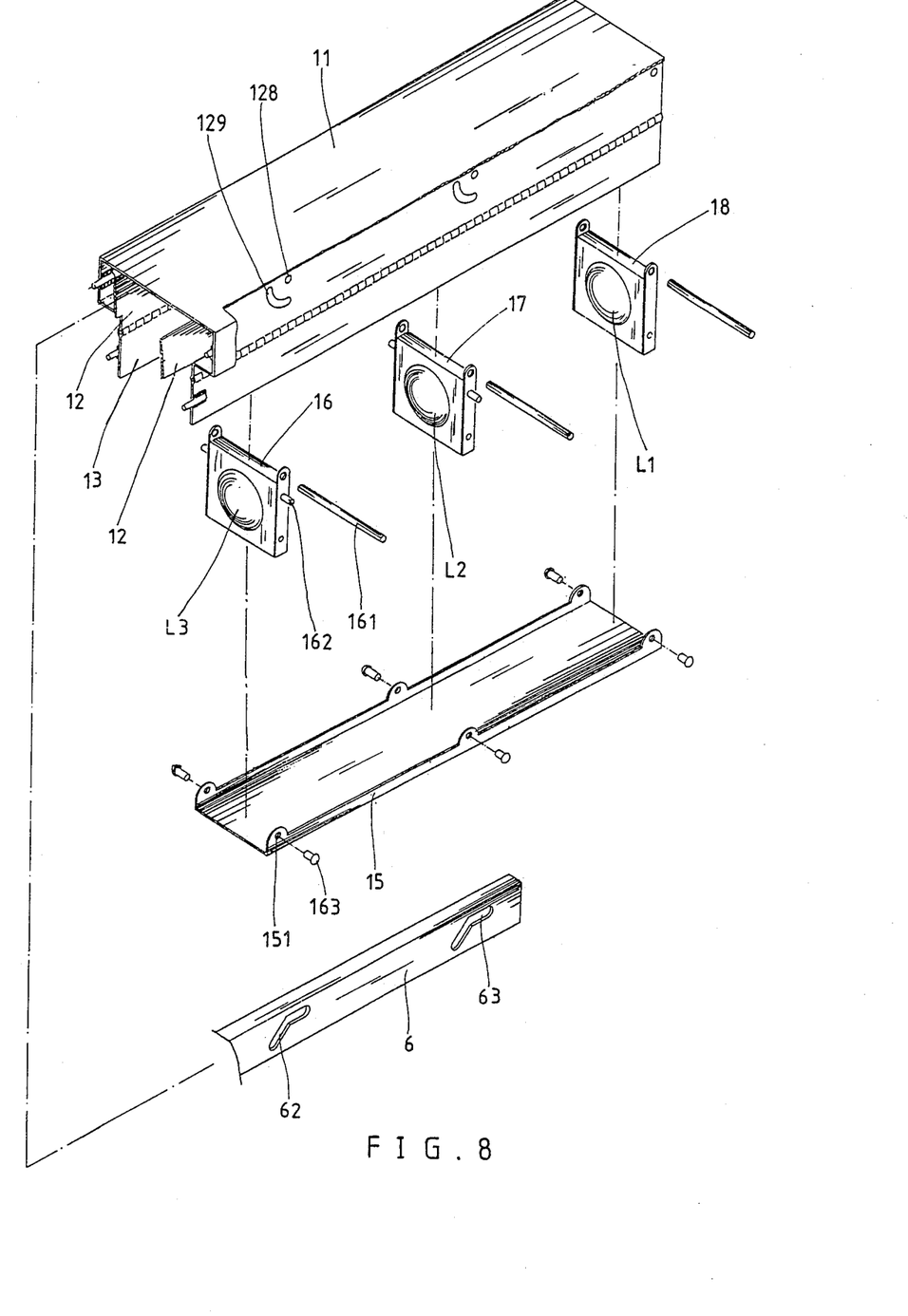
FIG. 8 is a fragmentary break-up view of another embodiment of the present invention relating to the structure of lens sets of the foldable optical conduit shown in FIG. 5.
Figure 9:
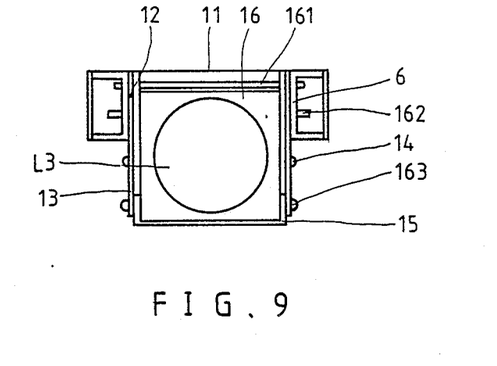
FIG. 9 is a fragmentary front view of another embodiment of the present invention shown in FIG. 8.
Figure 10:
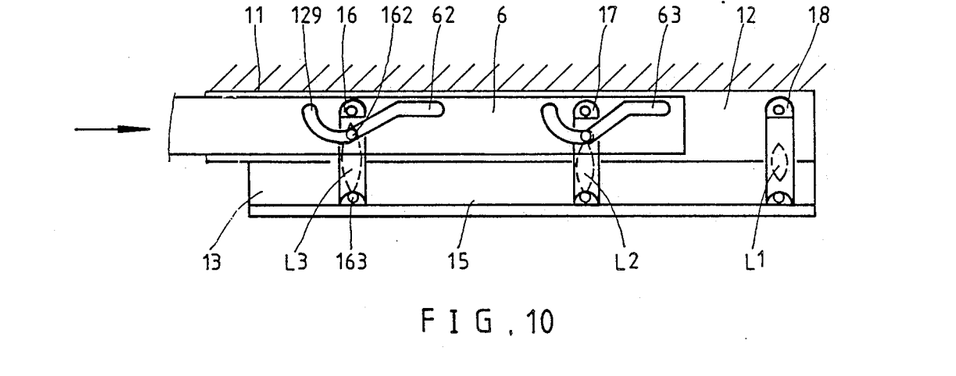
FIG. 10 is a fragmentary cutaway side view of another embodiment of the present invention, showing actuating frame and lens sets shown in FIG. 8.
Figure 11:
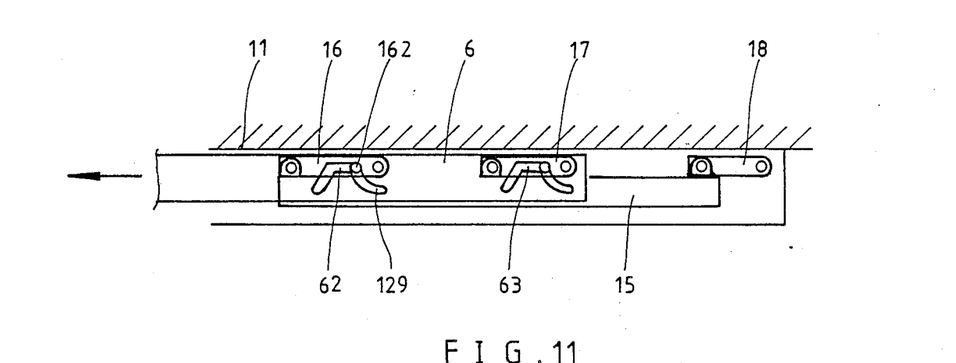
FIG. 11 is a fragmentary cutaway side view of another embodiment of the present invention, showing actuating frame and lens sets in a folded state shown in FIG. 8.

Referring to FIG. 87, the bottom wall 15 of the optical conduit is formed in a "U" shape cross-section, and is hung on the lower lateral side of the lens frame 16 by a stud pin 163 through a hole 151 on the upward flange of the bottom wall 15. The same practice applies to lens frames 17 and 18 for gripping the bottom wall 15.

On each upper and lateral side of the lens frames 16 and 17, there is a fixed stud pin 162, 172 which is inserted, respectively, into slot 129, 130 on the upper side wall 12.

Actuating frame 6 has curved slots 62, 63 which engage with stud pins 162, 172, respectively.

Figure 14:
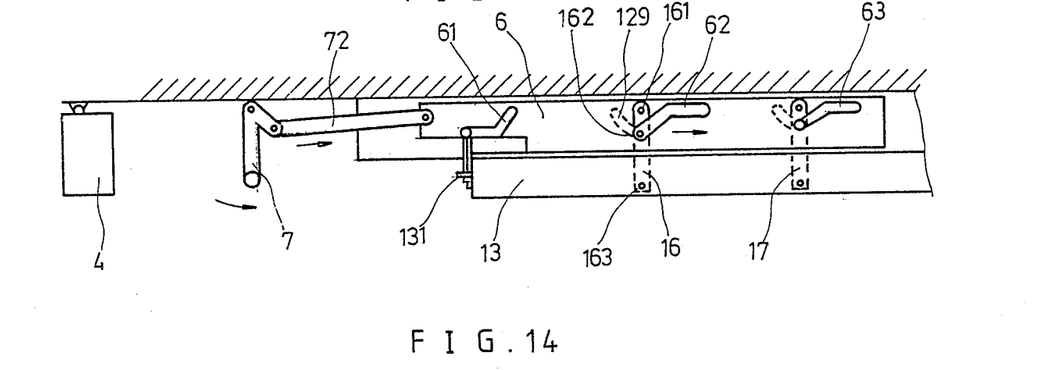
FIG. 14 is a fragmentary cutaway side view of another embodiment of the present invention showing the handle and actuating frame in a vertical position, shown in FIGS. 5 and 8.

Referring to FIGS. 13 and 14, upon movement of handle 7 from a halfway position to a vertical position, the actuating frame 6 moves in a rearward direction, and slots 62, 63 move stud pins 162, 172 downward, which in turn move lens frames 16, 17 from horizontal position to vertical position. The bottom wall 15 will then drag lens frame 18 from a horizontal to a vertical position. Top wall 11, side walls 12 and 13, and bottom wall 15 will be fully extended to form a rectangular optical conduit. With lens frames 16, 17, and 18 and lenses L3, L2, and L1, in vertical positions also, a full function optical conduit can be achieved.

By moving handle 7 from a vertical position to a horizontal position, the actuating frame 6 will first move lens frames 16, 17, and 18 into horizontal positions through the motion of slots 62 and 63. Then the lower side wall 13 will be moved to a horizontal and folded position through the motion of slot 61. Thus, the whole structure can be packed into a compact size to free up more headroom in the vehicle.

Figure 15:
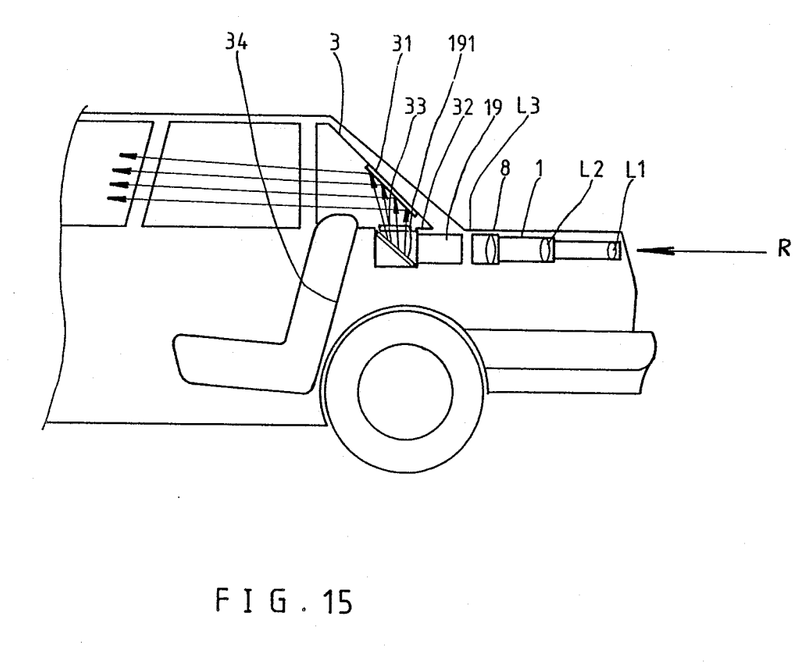
FIG. 15 is a fragmentary cutaway side view of a further embodiment of the present invention.
Figure 16:
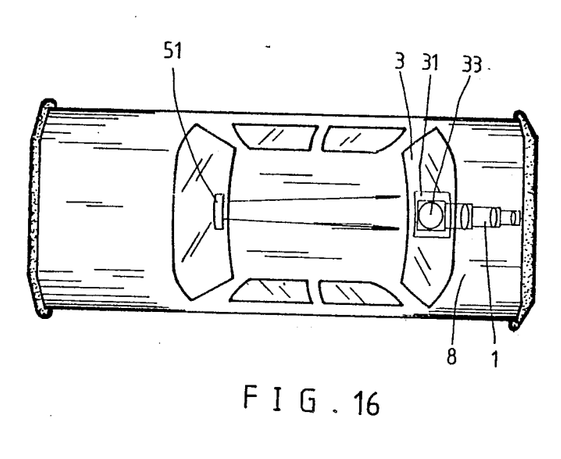
FIG. 16 is a top view of a further embodiment of the present invention shown in FIG. 15.

FIGS. 15 and 16 illustrate a further embodiment of the present invention, preferably for vehicles with a rear trunk compartment, comprising an optical conduit 1 which is centrally affixed longitudinally underneath a trunk lid 81, an object lens L1 which faces an aperture 82 on a rear lateral wall of the trunk lid 81, a hollow conduit 19 which is placed longitudinally under the rear window shelf 32 and having its rear opening facing the front opening of the optical conduit 1. There is a top opening 192 on the hollow conduit 19 which faces an opening 33 on the rear window shelf 32, an inclined reflecting mirror 191 is placed in the hollow conduit 19 with its surface facing both the rear opening and the top opening 192, an inclined reflecting sheet 31 is attached to the rear window 3, such that the rear image I3 of the rear view R is formed in the optical conduit 1 and is then reflected twice, on mirror 191 and reflecting sheet 31, eventually reaching the internal rear view mirror 51. Thus, a driver can look at mirror 51 to see the image I3 of rear view R, which is otherwise not visible.

Figure 17:
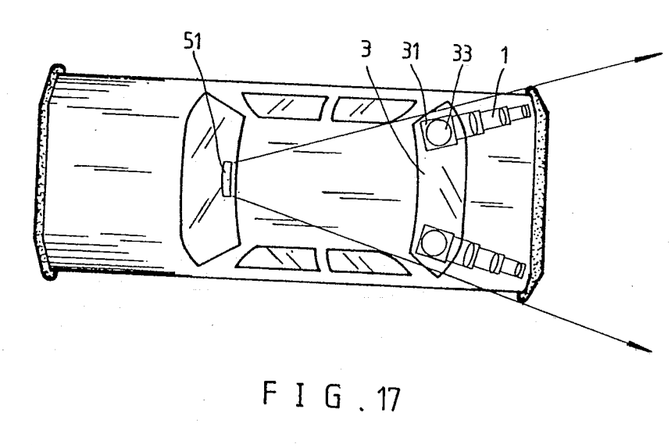
FIG. 17 is a top view of another embodiment of the present invention.
Figure 18:
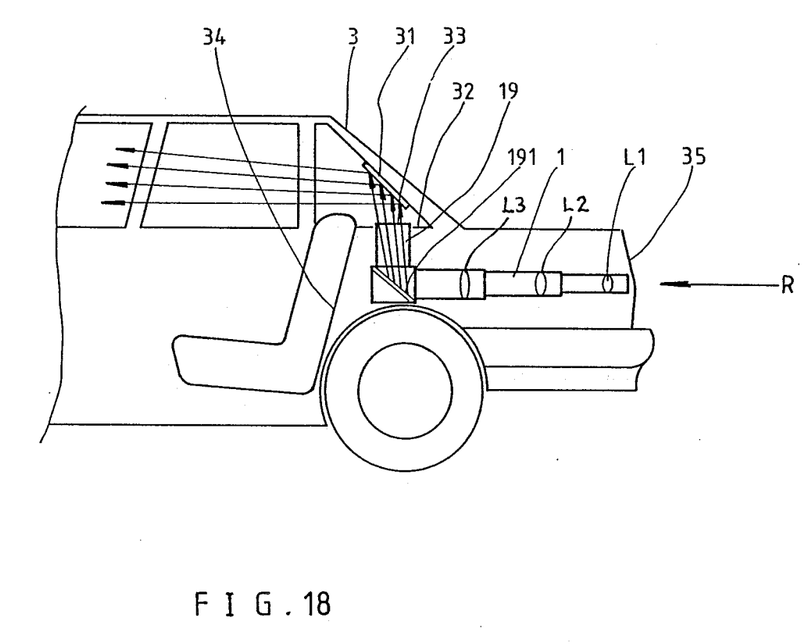
FIG. 18 is a fragmentary cutaway side view of another embodiment of the present invention shown in FIG. 17.
Figure 19:
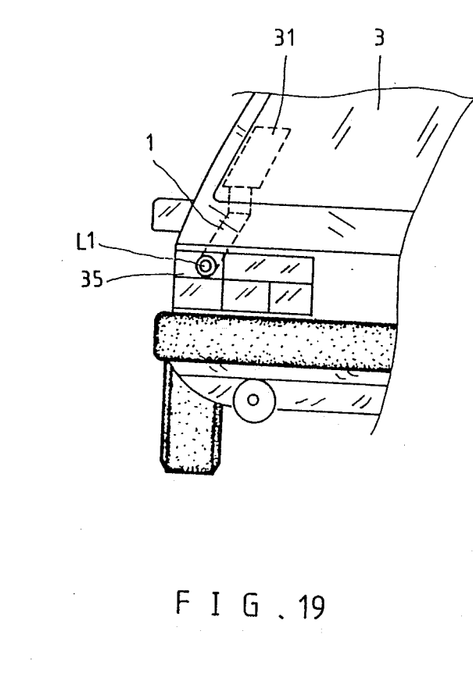
FIG. 19 is a fragmentary rear view of another embodiment of the present invention shown in FIG. 17.

FIGS. 17, 18, and 19 illustrate another embodiment of the present invention, similar to that shown in FIGS. 15 and 16, and which is preferably for a vehicle having a rear trunk compartment. The structure is similar to that in FIGS. 15 and 16, except that instead of placing the optical conduit 1 underneath the trunk lid, two optical conduits 1 have been disposed longitudinally along both side walls of a rear trunk compartment. The rear openings of the optical conduit 1 and the object lens L1 are pointing toward an opening in the rear lamp combination 35, thereby capturing rear view R. A hollow conduit 19 has its rear opening connecting with the front opening of optical conduit 1 and is secured under a rear window shelf 32. There is an inclined reflecting mirror 191, inside hollow conduit 19, which faces a reflecting sheet 31 attached to rear window 3.

Therefore, a driver, through internal mirror 51, can see the images I3 of rear view R on both sides behind the vehicle.

It is to be understood that the above disclosure of embodiment examples in the drawings and descriptions are only to serve for illustrative purpose, and do not intend to limit the scope of the present invention. Various changes and modifications may be made without departing from the scope of the present invention.

I claim:

1. A viewing means for an automotive vehicle comprising an optical conduit, said optical conduit having a fixed top wall, a movable bottom wall, two fixed upper side walls, a rectangular lens frame having lateral sides, said lens frame disposed on said upper side walls, a reflecting mirror disposed in front of said optical conduit, a plurality of convex lenses disposed in said rectangular lens frame so as to project images, viewable from the rear of the automotive vehicle, forward to said reflecting mirror, a pair of slidable actuating frames disposed longitudinally outside said upper side walls, a linkage disposed on each side of said actuating frames, two foldable side walls each having a front edge, a side wall stud pin disposed on each of said foldable side walls, a lateral side stud pin disposed on each lateral side of said lens frame, a plurality of curved slots disposed on said actuating frames, a rocker arm engageable at one end with one of said slots and at the other end with said side wall stud pin, said slots engageable with said lateral side stud pins, a handle disposed on one of said upper side walls, said handle connectable through said linkage to said actuating frame, said optical conduit being fixable to an underside roof section of an automotive vehicle such that a rear end of said optical conduit faces a rear window of the vehicle, whereby upon movement of said handle from a horizontal to a vertical position, said actuating frame moves said foldable side walls and said lens frame from a horizontal to a vertical position, and upon movement of said handle from a vertical to a horizontal position, said actuating frame moves said foldable side walls and said lens frame from a vertical to a horizontal position.

* * * * *